March 15, 1955 C. P. HEISKELL 2,704,051
SELF-FEEDING BARN CONSTRUCTION
Filed Dec. 3, 1951 4 Sheets-Sheet 1

Charles P. Heiskell
INVENTOR.

BY *Clarence A. O'Brien*
*and Harvey B. Jacobson*
Attorneys

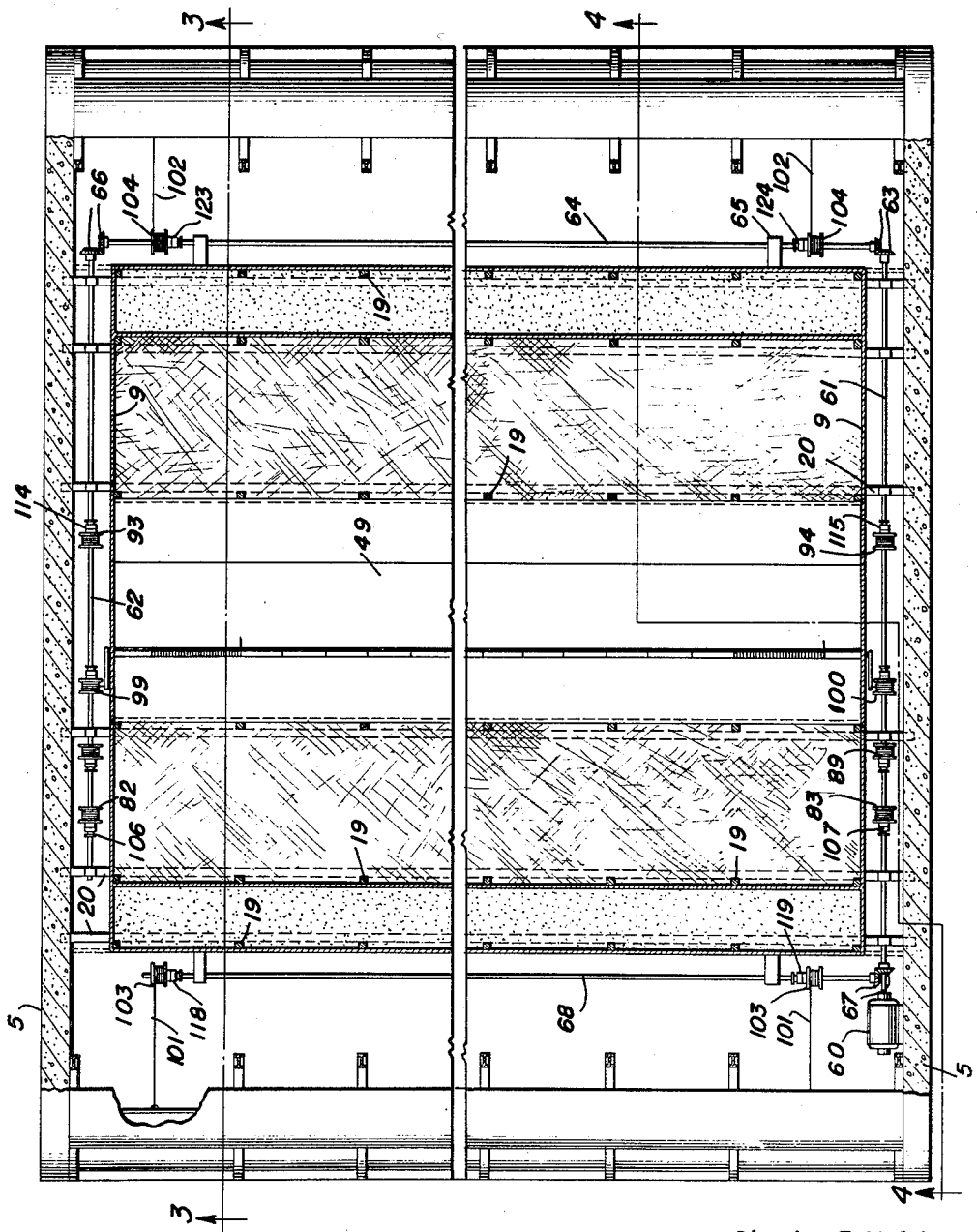

March 15, 1955  C. P. HEISKELL  2,704,051
SELF-FEEDING BARN CONSTRUCTION
Filed Dec. 3, 1951  4 Sheets-Sheet 3
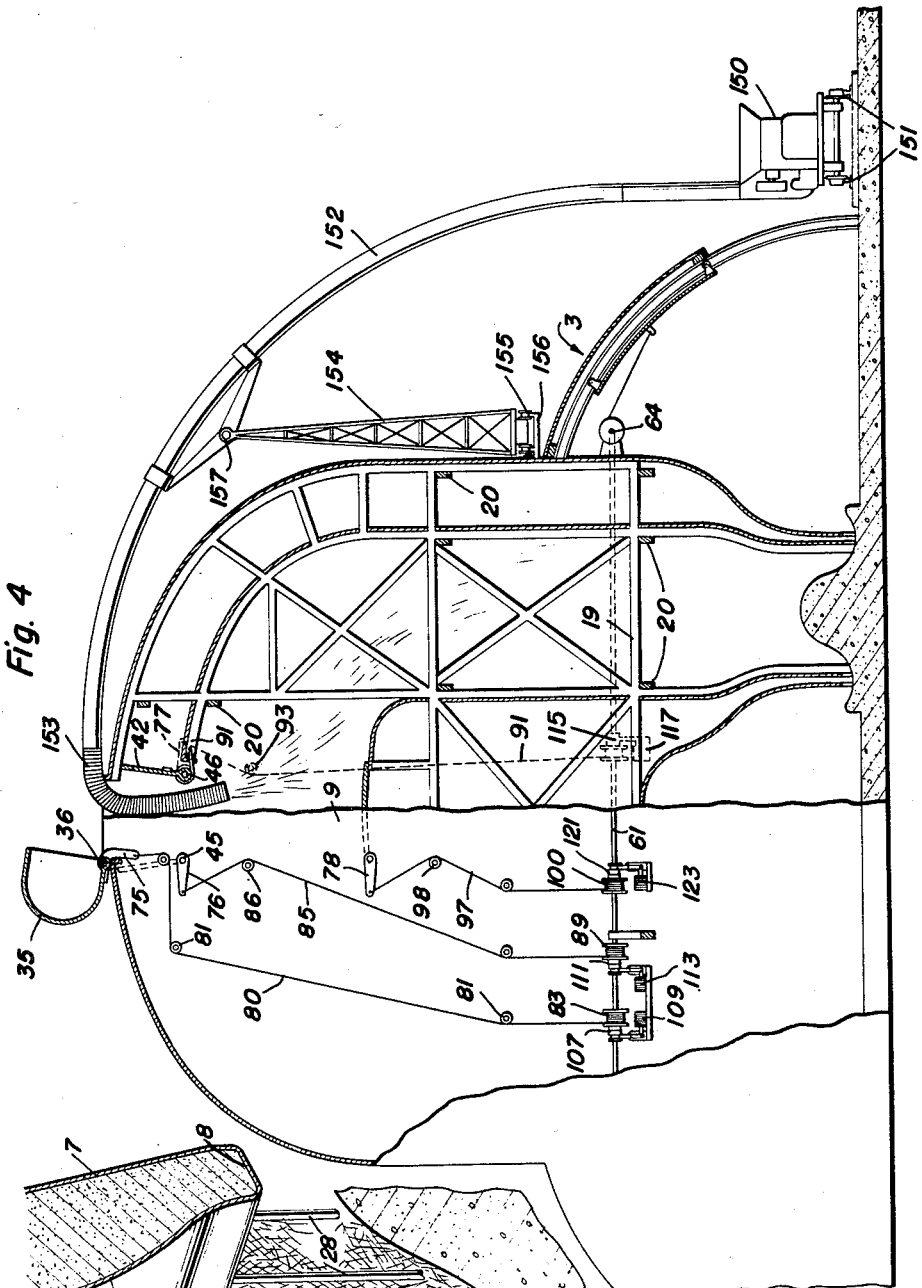
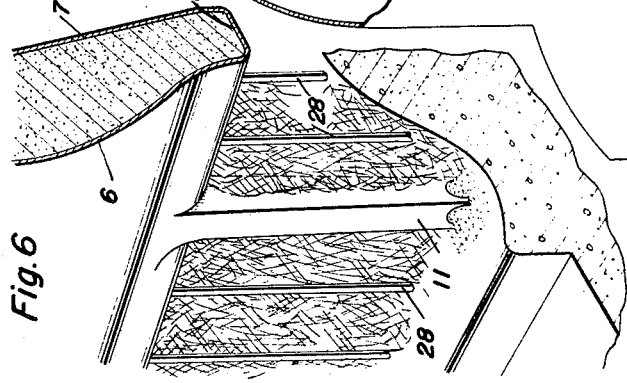
Charles P. Heiskell
INVENTOR.

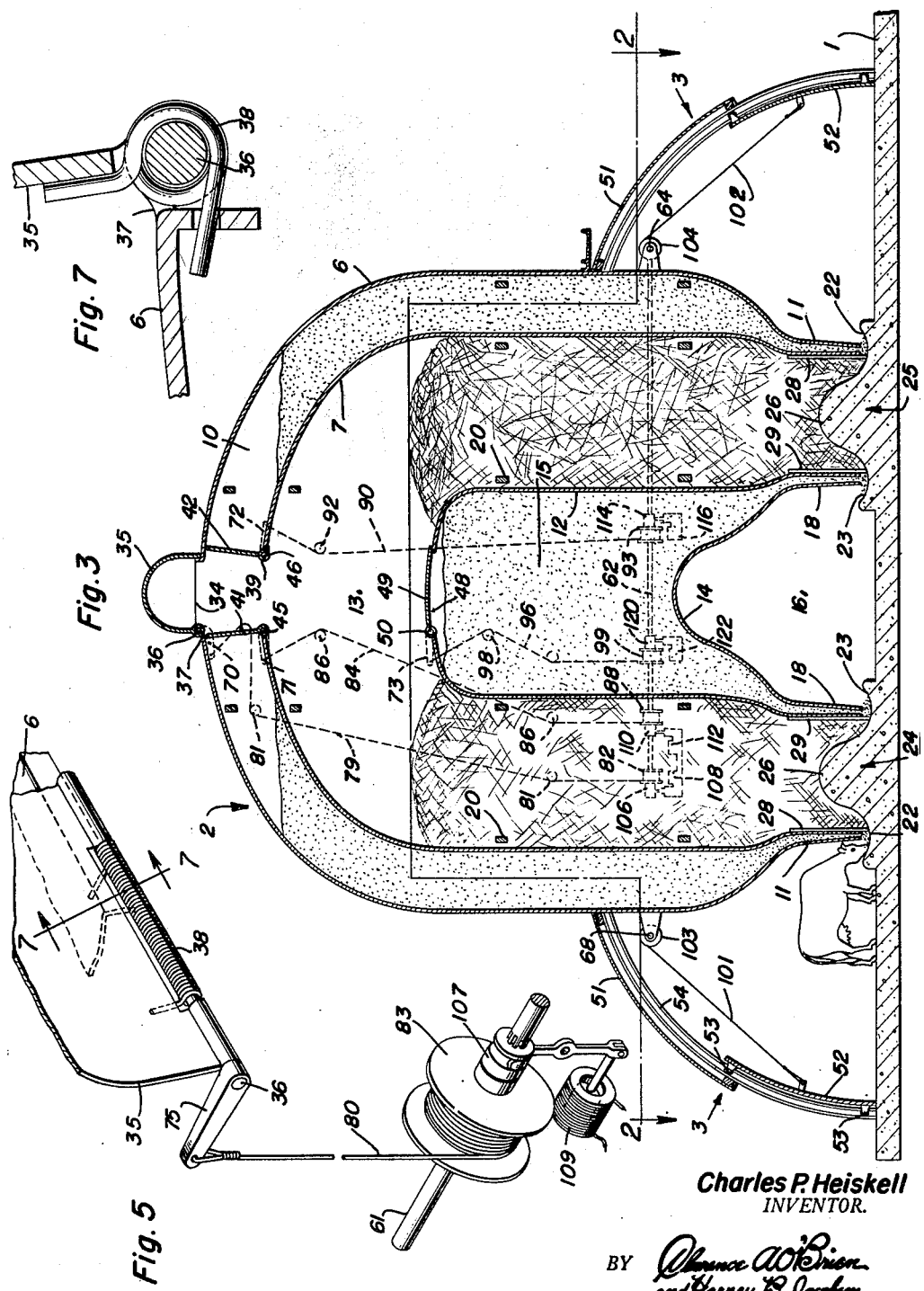

United States Patent Office 2,704,051
Patented Mar. 15, 1955

2,704,051

SELF-FEEDING BARN CONSTRUCTION

Charles P. Heiskell, Abilene, Kans.

Application December 3, 1951, Serial No. 259,588

3 Claims. (Cl. 119—52)

My invention relates to improvements in self-feeding barns for cattle, especially, though not necessarily, dairy cattle.

The primary object of my invention is to provide a self-feeding barn constructed for gravity feed of a variety of cattle foods into feed troughs extending substantially along the entire length of the barn, and without waste of food and which provides for feeding a maximum number of cattle in a given space.

Another object is to provide a barn for the above purpose which is adapted for filling at the top thereof with different kinds of cattle foods while maintaining the foods separate.

Still another object is to provide a barn adapted for the above purposes, and for adequate ventilation where the cattle are feeding and which is easy and comparatively inexpensive to build.

Other and subordinate objects, within the purview of my invention, together with the precise nature of my improvements will be readily understood when the succeeding description and claims are read with reference to the drawings accompanying and forming part of this specification.

In said drawings:

Figure 2 is a view in horizontal section taken on the irregular line 2—2 of Figure 3;

Figure 3 is a view in vertical transverse section taken on the line 3—3 of Figure 2;

Figure 4 is a view partly in end elevation and partly in vertical transverse section taken on the irregular line 4—4 of Figure 2;

Figure 5 is a fragmentary view in perspective of one of the doors and part of the operating means therefor;

Figure 6 is a fragmentary, enlarged view partly in perspective and partly in transverse section illustrating the manner in which the discharge spouts discharge into one of the troughs and also illustrating the rack forming rods;

Figure 7 is an enlarged view in transverse section taken on the line 7—7 of Figure 5.

Figure 1:
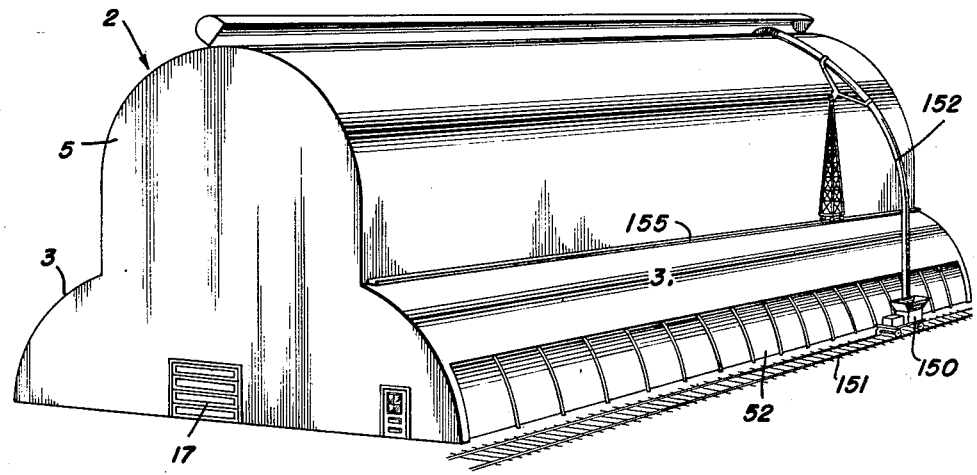
Figure 1 is a view in perspective of my improved barn in the preferred embodiment thereof.

Referring now to the drawings by numerals, the barn of my invention is of generally oblong, rectangular form with a concrete or cement floor 1, a central main, longitudinal section 2, a pair of lower cattle feeding shed sections 3 extending along opposite sides of the central section 2, and outer end walls 5 of concrete, or the like, common to said central and shed sections 2, 3.

The section 2 includes dome topped, spaced apart, longitudinally extending outer and inner walls 6, 7 of inverted U-shape converging at the bottoms thereof and joined, as shown at 8, in Figure 6 with wall 6 straddling wall 7. The space between the walls 6, 7 is closed adjacent said walls 5 of said section 2 by cross partitions 9 spaced inwardly of the end walls 5 for a purpose presently seen. The walls 6, 7 and partitions 9 form an outer inverted U-shaped grain storage and feeding chamber 10 having bottom vertical discharge spouts 11, as best shown in Figure 6, suitably spaced longitudinally of the chamber 10 at opposite sides of the section 2.

As will presently be seen, the inner wall 7 also forms a longitudinal partition in said section 2.

A longitudinal partition wall 12 of inverted, dome-topped, U-shape extends longitudinally and centrally in the section 2 and is spaced from the inner wall 7 and straddled thereby and forms therewith and with the partitions 9 an intermediate hay, or straw, storing and feed chamber 13 in said section 2 of inverted U-shape as best shown in Figure 3 which is open at its bottom at both sides of said section 2. As will be seen, the chamber 13 lies within the chamber 10 which is also of inverted U-shape.

Another longitudinal partition wall 14 of dome-topped, inverted U-shape and lower than the partition wall 12 extends longitudinally in the lower portion of the partitioning wall 12 and in the longitudinal center of the section 2 and is straddled by said wall 12 to form therewith a second inner, central grain storing and feeding chamber 15, said wall 14 also forming a longitudinal lower, central cattle feeding tunnel, or chamber, 16 in the bottom of the section 2, to both ends of which access may be had by cattle through doors in the end wall 5, one of which is shown in Figure 1 and designated 17. As will be understood upon reference to Figures 2 and 3, the chambers 10, 13 and 15 are closed at the ends thereof by the beforementioned partitions 9 and are not only of inverted U-shape but are nested to extend over the central feeding tunnel, or chamber, 16 and vertically at opposite sides of said chamber 16 for a purpose presently seen.

The partition walls 12 and 14 converge and are joined at the bottom of the chamber 15 at both sides of said chamber 15 and said chamber 15 is provided with vertical discharge spouts 18 suitably spaced longitudinally of said chamber at its bottom and at opposite sides thereof, all in the same manner as described with reference to chamber 10 and Figure 6.

The described partition walls 6, 7 and 12 are supported by transverse skeleton frames 19 which, in turn, are supported by longitudinal beams 20 suitably fixed in the end walls 5. The partitions 9 are similarly supported, whereas the partition wall 14 is supported by its connection to the partition wall 12.

As best shown in Figure 3, the discharge spouts 11 at opposite sides of the chamber 10, which are also at opposite sides of the section 2, discharge into feed troughs 22 which are accessible to cattle in the shed sections 3, the discharge spouts 18 on opposite sides of the chamber 15, and which are also at opposite sides of chamber 16 discharge into troughs 23 at opposite sides of the chamber 16 accessible to cattle in the chamber 16, the troughs 22, 23 forming duplex pairs, designated as a unit, 24, 25 which extend longitudinally of the floor 1 and are formed therewith so that grain or grains may be discharged at opposite sides of the chamber 13 in each pair of troughs 24, 25. Also, as best shown in Figure 3, the troughs 22, 23 of each pair 24, 25 are separated by a dividing rib 26 of convex form in cross section for deflecting hay or straw fed from the chamber 13 into the troughs 22, 23 of each pair.

As shown in Figure 6, rack forming rods 28 depend from the bottom of the chamber 13 to prevent hay or straw feed from spreading out over the troughs 22, 23 and thereby prevent such feed from being wasted by the cattle. Similar rack rods 29 are provided for the same purpose on the bottom of the chamber 15 at both sides thereof.

A longitudinally extending top, central, filler opening 34 is provided in the outer wall 6 and closed by an upwardly opening door 35 of inverted channel form in cross section to shed water. The door 35 is fastened on a door operating pintle rod 36 journaled in hinge ears 37 on said wall 6 for opening and closing movement of said door. Suitably arranged coil springs 38 one of which is shown in Figures 5 and 7, are provided on the pintle rod 36 to swing the door 35 closed.

A longitudinal central filler opening 39, like the opening 34, is provided in the top of wall 7 beneath and aligned with the opening 34 for filling the chamber 13. A pair of trapdoors 41, 42 are hinged, like the door 35, to the partition wall 7 at opposite sides of said opening 39 and are spring tensioned, like the door 35 for closing movement. However, the doors 41, 42 close in overlapping relation and when opened, swing upwardly in a vertical position at opposite sides of the openings 34, 39 to close off the chamber 10 from the opening 34 and form a chute leading to the chamber 13 for a purpose presently seen. As will also presently be seen, each door 41, 42 may be opened to close off one side of the chamber 10 from the opening 34 while the other door 41, or 42, as the case may be, closes the opening 39. As will be understood, the doors 41, 42 are fast on door operating pintle rods 45, 46 like the pintle rod 36.

The chamber 15 is adapted to be filled through a longitudinal, elongated, top filler opening 48 in the top of the partitioning wall 12 closed by a trapdoor 49 fast on a door operating pintle rod 50 and otherwise hinged and tensioned like the door 35 to swing closed and be opened against spring tension. As best shown in Figure 3, the filler opening 48 is vertically aligned with the filler openings 34 and 39.

The shed sections 3, which are each provided with an outer arched side wall 51, are provided respectively with an upwardly opening door 52 extending substantially the full length thereof and slidably mounted by rollers 53 on grooved guides 54 supporting the wall 51, said doors 52 closing under the influence of gravity.

Electrically controlled power operated door opening mechanisms for selectively opening the described doors 35, 41, 42, 49, 52 is provided and which will now be described.

An electric motor 60 mounted in one end wall 5, preferably, although not necessarily, in one shed section 3, drives a horizontal reel operating shaft 61 journaled in the lowermost ones of the beforementioned beams 20 in the space between one end wall 5 and the adjacent partition 9. A second horizontal reel operated shaft 62 is similarly journaled in the space between the other end wall 5 and the adjacent partition 9. The shaft 61 is operatively geared, as at 63, to one end of a third reel operating, horizontal jack shaft 64 journaled in bearing brackets 65 in one shed section 3 to extend along one side of the wall 6 and having its other end geared, as at 66, to one end of said second shaft 62 to operate the same. The shaft 61 is geared adjacent its other end, as at 67, to another reel operating, jack shaft 68 journaled in the same manner as the jack shaft 64 but in the other shed section 3. The door operating pintle rods 36, 45, 46, 50 extend at one end out of one partition 9 and are provided between said partitions on the adjacent end wall 5 with operating cranks 70, 71, 72, 73, respectively. The other ends of the door operating pintle rods 36, 45, 46, 50 similarly extend out of the other partition 9 and are provided with operating cranks 75, 76, 77, 78 between said other partitions 9 and the other end wall 5. The crank arms 71, 75 on the door operating pintle rod 36 for the door 35 are connected by pull cables 79, 80 trained over idlers 81 to reels 82, 83 loose on the shafts 62, 61. Pull cables 84, 85 trained over idlers 86 connect the operating cranks 71, 76 of the door operating pintle rod 45 to reels 88, 89 loose on the shafts 62, 61, respectively, and similar cable 90, 91 trained over idlers 92 connect the crank arms 72, 77 on the door operating pintle rod 46, to reels 93, 94 loose on the shafts 62, 61 respectively. Pull cables 96, 97 trained over idlers, as at 98, connect the operating cranks 73, 78 on the door operating pintle rod 50 to reels 99, 100 loose on said shafts 62, 61 respectively. The doors 52 of the shed sections 3 are opened each by a pair of cables designated 101 in one pair and 102 in the other pair, each pair being connected to a pair of reels 103, 104, the pair of reels 103 being loose on the jack shaft 68 and the pair of reels 104 being loose on the jack shaft 64.

The shafts 62, 61 are provided with a pair of clutches 106, 107 engaged by solenoids 108, 109 for operating reels 82, 83, a pair of clutches 110, 111 engaged by solenoids 112, 113 for operating the reels 88, 89, and another pair of clutches 114, 115 engaged by solenoids 116, 117 for operating the reels 93, 94. The jack shaft 68 is provided with a pair of clutches 118, 119 engaged by solenoids 120, 121 for operating the pair of reels 103 and the jack shaft 64 is provided with a pair of clutches 123, 124 engaged by solenoids 125, 126 for operating the pair of reels 104.

Figure 8:
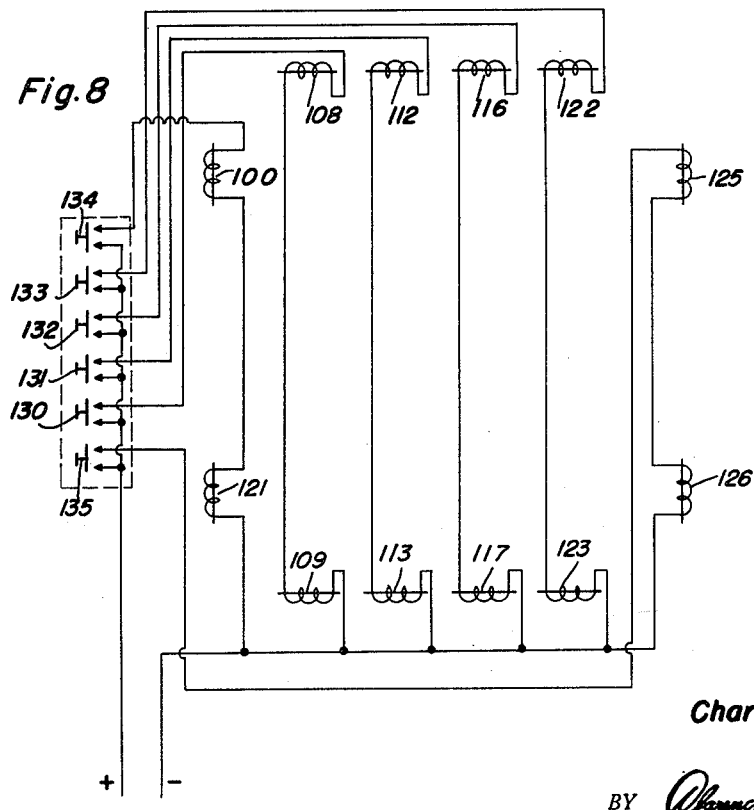
Figure 8 is a diagrammatic view of the push button controlled electric circuit for energizing the solenoids, forming part of the electrically controlled power operated door opening means.

Any suitable electric circuit may be utilized for energizing the described solenoids, for instance, that shown in Figure 8 and controlled by push button switch 130 energizing the pair of solenoids 108, 109, a push button switch 131 energizing the pair of solenoids 112, 113, the push button switch 132 for energizing the pair of solenoids 116, 117, and a like switch 133 for energizing the pair of solenoids 122, 123, another such switch 134 for energizing the pair of solenoids 120, 121 and still another push button switch 35 for energizing the pair of solenoids 125, 126. As will be seen, the solenoids are connected in pairs in parallel in the circuit.

A suitable type of conventional feed cutter and elevating implement 150 for cutting silage and the like, is provided at one side of the barn to be propelled on tracks 151 alongside one shed section 3, said cutter and elevator being adapted to chop stalks or hay feed and blow the same, as well as grain, up a discharge tube 152 rising from the implement and curving up over the section 2 with a flexible discharge spout 153 for insertion downwardly into the filler openings 134, 139. A skeleton structure mast 154 is supported by rollers 155 on a track 156 fixed horizontally to the section 2 above said shed section 3, the mast being connected at a top end, as at 175 to the tube 152 to brace the same while the implement is propelled along the tracks 151.

As will now be seen, with the door 35 open and the doors 41, 42 closed the chamber 10 may be filled with feed, and with the doors 35, 41, 42 and 49 open, the chamber 15 may be filled, while with the doors 35, 41, 42 open and the door 49 closed, the chamber 13 may be filled. Also, when the doors 41, 42 are open, the same close-off the chamber 10 while the chamber 13, or 15 is being filled to prevent possible overflow from overfilled chamber 10 into chamber 13. Push button switches 130 to 135 may be arranged on a switch panel, not shown, in any convenient location in the barn and, as will now be clear, provide for push button control of opening of doors 35, 41, 42, 49, 52 selectively as may be required. Of course, after any or all of the described feed storage and feeding chambers are filled, the flexible discharge spout 153 may be withdrawn out of the filler opening 34 to permit closing of any of the doors which have been opened for filling purposes. The described push button switches may be of any suitable type designed to remain closed as long as desired and the motor 60 may be controlled by any suitable switch, not shown, for stopping the power drive when any door or doors are fully opened. Obviously, when any push button switch is opened, the corresponding pair of solenoids will be de-energized to disengage the corresponding clutches so that the reels with which such clutches are associated may idle to permit the door opened thereby to close by spring tension.

All of the described clutches are friction clutches designed to slip after opening of the associated doors so that opening of any door will not block further operation of the door opening mechanism for opening other doors.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the inventive claims.

Having described the invention, what is claimed as new is:

1. A cattle barn comprising a floor, vertical end walls, a pair of laterally spaced longitudinally extending feed trough structures on said floor each comprising an inner and an outer longitudinal feed trough, a tunnel-shaped central wall extending between said end walls and forming a cattle feeding tunnel between the inner feed troughs, a relatively higher partition wall of inverted U-shape extending between said end walls and straddling the tunnel-shaped wall and forming therewith a central gravity feed grain storage chamber, grain discharge spouts spaced along opposite sides of said central chamber above and discharging into the inner feed troughs, outer and inner walls of inverted U-shape extending between said end walls, the inner wall being straddled by the outer wall and straddling the partition wall, said inner wall forming with said partition wall a gravity feed hay storage chamber of inverted U-shape discharging at opposite sides thereof into the inner and outer troughs of the pair of trough structures, said inner wall forming with said outer wall a second gravity feed grain storage chamber, discharge spouts along opposite sides of the second chamber above and discharging into the outer troughs of said pair of trough structures, and means for filling said chambers from the outside of the outer wall.

2. A cattle barn according to claim 1, said central chamber and said second chamber having bottoms from which said spouts depend and which are closed between said spouts.

3. A cattle barn according to claim 2, and rack rods depending from the bottoms of said chambers between the spouts to prevent the discharged hay from spreading over the trough structures.

References Cited in the file of this patent

UNITED STATES PATENTS

| | | |
|---|---|---|
| 596,804 | Busch | Jan. 4, 1898 |
| 1,771,701 | Amberson | July 29, 1930 |
| 1,788,244 | Larson | Jan. 6, 1931 |
| 2,000,102 | Shodron | May 7, 1935 |
| 2,003,868 | Shodron | June 4, 1935 |
| 2,454,721 | Severance et al. | Nov. 23, 1948 |
| 2,549,155 | Ash | Apr. 17, 1951 |
| 2,626,591 | Mazur et al. | Jan. 27, 1953 |
| 2,654,344 | Peterson et al. | Oct. 6, 1953 |

OTHER REFERENCES

Farm Implement News, Oct. 25, 1950, page 54.